United States Patent
Braun

(10) Patent No.: US 10,474,672 B2
(45) Date of Patent: Nov. 12, 2019

(54) METHOD FOR COMPARING TEXT FILES WITH DIFFERENTLY ARRANGED TEXT SECTIONS IN DOCUMENTS

(71) Applicant: Schlafender Hase GmbH Software & Communications, Frankfurt am Main (DE)

(72) Inventor: Elmar Braun, Kassel (DE)

(73) Assignee: SCHLAFENDER HASE GMBH SOFTWARE & COMMUNICATIONS (DE)

( * ) Notice: Subject to any disclaimer, the term of this patent is extended or adjusted under 35 U.S.C. 154(b) by 725 days.

(21) Appl. No.: 14/835,025

(22) Filed: Aug. 25, 2015

(65) Prior Publication Data

US 2017/0060939 A1    Mar. 2, 2017

(51) Int. Cl.
```
G06F 16/00      (2019.01)
G06F 16/245     (2019.01)
G06F 16/93      (2019.01)
G06F 17/27      (2006.01)
```
(52) U.S. Cl.
CPC ............ *G06F 16/245* (2019.01); *G06F 16/93* (2019.01); *G06F 17/277* (2013.01)

(58) Field of Classification Search
CPC .......... G06F 16/31; G06F 16/35; G06F 16/36; G06F 16/93; G06F 16/245; G06F 16/285; G06F 16/287; G06F 16/353; G06F 16/355; G06F 16/367; G06F 16/951
See application file for complete search history.

(56) References Cited

U.S. PATENT DOCUMENTS

| | | | | |
|---|---|---|---|---|
| 5,687,364 A | * | 11/1997 | Saund ................... | G06F 16/355 704/5 |
| 6,094,484 A | * | 7/2000 | Hall, Jr. ................. | G06K 9/72 380/28 |

(Continued)

OTHER PUBLICATIONS

"Redundancy in electronic health record corpara: analysis, impact on text mining performance and mitigation strategies" by Raphael Cohen et al, dated Jan. 16, 2013.

(Continued)

*Primary Examiner* — Ashish Thomas
*Assistant Examiner* — Rezwanul Mahmood
(74) *Attorney, Agent, or Firm* — Gerald H. Hespos; Michael J. Porco; Matthew T. Hespos

(57) ABSTRACT

A method for comparing and analyzing digital documents includes searching for unambiguous roots in both documents. These roots are unique units that occur in both documents. The roots can be individual words, word groups or other unambiguous textual formatting functions. There is then a search for identical roots in the other document (Root1 from Content1, and Root2 from Content2, with Root1=Root2). If a pair is found, the area around these roots is compared until there is no longer any agreement. During the area search, both preceding words and subsequent words are analyzed. The areas that are found in this way, Area1 around Root1 and Area2 around Root2, are stored in lists, List1 and List2, allocated to Doc1 and Doc2. This procedure is repeated until no roots can be found any longer. The result is either a remaining area that has no overlaps, or complete identity of the documents.

17 Claims, 3 Drawing Sheets

(56) References Cited

U.S. PATENT DOCUMENTS

| | | | | |
|---|---|---|---|---|
| 6,389,091 | B1* | 5/2002 | Yamaguchi | H03K 5/133 327/158 |
| 6,658,626 | B1* | 12/2003 | Aiken | G06F 17/2211 715/205 |
| 6,778,995 | B1* | 8/2004 | Gallivan | G06F 16/287 707/739 |
| 7,392,251 | B2 | 6/2008 | Raczek | |
| 7,716,162 | B2* | 5/2010 | Egnor | G06F 17/27 707/724 |
| 8,352,535 | B2* | 1/2013 | Peled | G06F 21/10 709/200 |
| 8,463,790 | B1* | 6/2013 | Joshi | G06F 16/93 707/738 |
| 2003/0120647 | A1* | 6/2003 | Aiken | G06F 16/951 707/999.003 |
| 2003/0167163 | A1* | 9/2003 | Glover | G06F 16/355 704/9 |
| 2004/0148280 | A1* | 7/2004 | Chimura | G06Q 10/10 707/999.003 |
| 2006/0129548 | A1* | 6/2006 | Raczek | G06F 17/2211 707/999.005 |
| 2007/0282809 | A1* | 12/2007 | Hoeber | G06F 16/338 707/999.003 |
| 2008/0091413 | A1* | 4/2008 | El-Shishiny | G06F 16/322 704/10 |
| 2008/0114725 | A1* | 5/2008 | Indeck | G06F 16/22 707/999.002 |
| 2008/0120292 | A1* | 5/2008 | Sundaresan | G06F 16/355 707/999.005 |
| 2009/0094021 | A1* | 4/2009 | Marvit | G06F 17/2735 704/9 |
| 2009/0094233 | A1* | 4/2009 | Marvit | G06F 16/313 707/999.005 |
| 2009/0116741 | A1* | 5/2009 | Emam | G06F 17/27 382/168 |
| 2009/0204609 | A1* | 8/2009 | Labrou | G06F 16/3322 707/999.005 |
| 2009/0254543 | A1* | 10/2009 | Ber | G06F 16/907 707/999.005 |
| 2009/0324074 | A1* | 12/2009 | Dembo | G06T 5/009 382/168 |
| 2010/0054611 | A1* | 3/2010 | Nomura | G06K 9/4642 382/224 |
| 2010/0313118 | A1* | 12/2010 | Acquaviva | G06F 16/367 715/254 |
| 2011/0060747 | A1* | 3/2011 | Rose | G06F 16/313 707/750 |
| 2011/0067555 | A1* | 3/2011 | Sugai | G10H 1/40 84/612 |
| 2011/0078191 | A1* | 3/2011 | Ragnet | G06K 9/00879 707/780 |
| 2011/0137898 | A1* | 6/2011 | Gordo | G06F 16/35 707/737 |
| 2011/0235902 | A1* | 9/2011 | Chittar | G06K 9/3208 382/162 |
| 2011/0238659 | A1* | 9/2011 | Chittar | G06F 16/5838 707/724 |
| 2011/0295850 | A1* | 12/2011 | Tankovich | G06F 17/00 707/727 |
| 2011/0314031 | A1* | 12/2011 | Chittar | G06Q 30/00 707/749 |
| 2012/0033250 | A1* | 2/2012 | Grasso | G06Q 10/10 358/1.15 |
| 2012/0117082 | A1* | 5/2012 | Koperda | G06F 16/3331 707/748 |
| 2012/0177294 | A1* | 7/2012 | Ke | G06F 16/532 382/197 |
| 2012/0204104 | A1* | 8/2012 | Walsh | G06F 17/30705 715/273 |
| 2012/0213438 | A1* | 8/2012 | Quan | G06K 9/00744 382/170 |
| 2012/0226661 | A1* | 9/2012 | Kenthapadi | G06F 16/951 707/634 |
| 2012/0251010 | A1* | 10/2012 | Cao | G06K 9/4671 382/201 |
| 2013/0097104 | A1* | 4/2013 | Lu | G06N 20/00 706/12 |
| 2013/0159292 | A1* | 6/2013 | Larlus | G06F 16/40 707/723 |
| 2013/0262465 | A1* | 10/2013 | Galle | G06F 16/353 707/737 |
| 2013/0325779 | A1* | 12/2013 | Shahshahani | G06N 5/02 706/46 |
| 2014/0046654 | A1* | 2/2014 | Takuma | G06F 17/21 704/9 |
| 2014/0201126 | A1* | 7/2014 | Zadeh | G06N 7/005 706/52 |
| 2014/0236941 | A1* | 8/2014 | Johns | G06F 17/30873 707/730 |
| 2014/0278359 | A1* | 9/2014 | Speer | G06F 17/2785 704/9 |
| 2014/0280014 | A1* | 9/2014 | Komissarchik | G06Q 10/06 707/710 |
| 2014/0289632 | A1* | 9/2014 | Suzuki | G06F 3/167 715/728 |
| 2014/0365515 | A1* | 12/2014 | Garrett | G06F 16/332 707/759 |
| 2015/0138382 | A1* | 5/2015 | Xiao | H04N 5/23222 348/208.2 |
| 2015/0199411 | A1* | 7/2015 | Greenspan | G06F 16/2474 715/229 |
| 2015/0264085 | A1* | 9/2015 | Katayama | H04L 51/08 726/22 |
| 2015/0269161 | A1* | 9/2015 | Bhagavan | G06F 16/24578 707/776 |
| 2015/0345056 | A1* | 12/2015 | Imaizumi | D05B 19/08 700/138 |
| 2016/0055261 | A1* | 2/2016 | Reinhardt | G06F 16/248 707/798 |
| 2017/0060939 | A1* | 3/2017 | Braun | G06F 17/277 |
| 2017/0262455 | A1* | 9/2017 | Gallivan | G06F 3/0641 |

OTHER PUBLICATIONS

"A Densitometric Approach to Web Page Segmentation" by Christian Kohlschütter et al, dated Oct. 26, 2008.
European Search Report dated Mar. 8, 2017.
Communication dated Oct. 22, 2018 from EPO in EP Appl. No. 16 179 852.5.

* cited by examiner

Fig. 3

| | | |
|---|---|---|
| The name of this medicine is DeviEx 5 mg tablets. Each tablet contains 5 mg devocilanix as active ingredient. The tablets contain also the following inactive ingredients:<br><br>*Lactose*, magnesium stearate, baking soda, calcium caprylate, citric acid, dicalcium phosphate, methyl paraben<br><br>DeviEx 5 mg tablets are available in cartons containing 20 tablets. DeviEx 5 *mg tablets belong to a group of medicine called antineoplastic or cytotoxic drugs which are used to reduce pain in the joints, gums and the back.*<br><br>The name of this medicine is DeviEx 10 mg tablets. Each tablet contains 10 mg devocilanix as active ingredient. The tablets contain also the following inactive ingredients:<br><br>*Lactose*, magnesium stearate, baking soda, calcium caprylate, citric acid, dicalcium phosphate, methyl paraben<br><br>DeviEx 10 mg tablets are available in cartons containing 20 tablets. DeviEx *10 mg tablets belong to a group of medicine called antineoplastic or cytotoxic drugs which are used to reduce pain in the joints, gums and the back.*<br><br>The name of this medicine is DeviEx 20 mg tablets. Each tablet contains 20 mg devocilanix as active ingredient. The tablets contain also the following inactive ingredients:<br><br>*Lactose*, magnesium stearate, baking soda, calcium caprylate, citric acid, dicalcium phosphate, methyl paraben<br><br>DeviEx 20 mg tablets are available in cartons containing 20 tablets. DeviEx *20 mg tablets belong to a group of medicine called antineoplastic or cytotoxic drugs which are used to reduce pain in the joints, gums and the back.* | (1)<br><br><br><br>(4)<br><br><br><br><br>(2)<br><br><br><br><br>(5)<br><br><br><br><br>(3)<br><br><br><br>(6) | The name of this medicine is DeviAx 5 mg tablets. Each tablet contains 5 mg devocilanix as active ingredient. The tablets contain also the following inactive ingredients:<br><br>*Lactose*, magnesium stearate, baking soda, calcium caprylate, citric acid, dicalcium phosphate, methyl paraben<br><br>DeviAx 5 mg tablets are available in cartons containing 20 tablets. DeviAx 5 *mg tablets belong to a group of medicine called antineoplastic or cytotoxic drugs which are used to reduce pain in the joints, gums and the back.*<br><br>The name of this medicine is DeviAx 10 mg tablets. Each tablet contains 10 mg devocilanix as active ingredient. The tablets contain also the following inactive ingredients:<br><br>*Lactose*, magnesium stearate, baking soda, calcium caprylate, citric acid, dicalcium phosphate, methyl paraben<br><br>DeviAx 10 mg tablets are available in cartons containing 20 tablets. DeviAx *10 mg tablets belong to a group of medicine called antineoplastic or cytotoxic drugs which are used to reduce pain in the joints, gums and the back.*<br><br>The name of this medicine is DeviAx 20 mg tablets. Each tablet contains 20 mg devocilanix as active ingredient. The tablets contain also the following inactive ingredients:<br><br>*Lactose*, magnesium stearate, baking soda, calcium caprylate, citric acid, dicalcium phosphate, methyl paraben<br><br>DeviAx 20 mg tablets are available in cartons containing 20 tablets. DeviAx *20 mg tablets belong to a group of medicine called antineoplastic or cytotoxic drugs which are used to reduce pain in the joints, gums and the back.* | ns in DOCUMENTS

METHOD FOR COMPARING TEXT FILES WITH DIFFERENTLY ARRANGED TEXT SECTIONS IN DOCUMENTS

FIELD OF THE INVENTION

The invention relates to a method for systematically comparing the contents of at least two digitally stored documents. The invention relates in particular to a method for comparing documents comprising different formatting and a different document format.

By using different document types and styles, such as for example Word and PDF, often a great deal of time, effort and expense is required to compare whether all the information in the source document is indeed present in the target document. Thus for example at the pre-printing stage, PDF is often used, wherein the source document is often available in RTF or DOC formats. A comparison by means of document software is possible only with considerable difficulty. Furthermore, a comparison of text documents with a free arrangement of the text passages in layers (or streams) such as e.g. in HTML or PDF, with text documents where the information in the text flow is arranged to accord with the flow of reading (e.g. TXT, RTF, DOC) or with other layer documents has so far not been possible in a satisfactory way.

The Comparison of a pair of similar text documents for the purpose of quickly identifying their differences is one the important aspects to be solved. The differences can be a mixture of differences in text order (i.e. text fragments appear in both documents in different sequence), and insertions, deletions, and changes (i.e. text fragments appear in only one document).

A good comparison maximizes the amount of text matched, and minimizes the number of discontinuities in the text sequence required to match that much text. When assessing the differences between two texts, the former is desirable because it minimizes the amount of differences that must be considered. The latter is desirable because text is usually linear in nature; discontinuities therefore inhibit its understanding.

STATE OF THE ART

In the state of the art, text-comparing algorithms monitor the document flow within the documents to be compared or try to reconstruct the flow of reading. In this process, any relocation of text passages is detected as cutting and pasting. In document files in which the document flow differs from the text flow, a large number of changes are thus shown, which are of no help to the user.

From the printed publication by Heckel, P: A Technique for Isolating Differences between Files, April 1978, a method for finding roots is known. This publication explains that apart from the mentioned lines, other units can be considered. In this process, the documents are being passed through in a linear manner from the front and from the back, with the allocation of the roots being transferred to their neighbouring elements, wherein in 5 linear passes agreements are found.

The algorithm U.S. Pat. No. 7,392,251 B2 of the same applicant works similar to the following steps:

1. Search both texts for so-called roots, which are short text fragments that occur exactly once in each of the texts.
2. Expand the matches around the roots as far as possible, i.e. up to before the first mismatch where the texts differ, both forward and backward.
3. Keep the longest resulting candidate match.
4. Discard all candidate matches that overlap the match chosen in step 3.
5. Continue in step 3 until no more candidate matches remain.
6. Continue in step 1, searching only the remaining unmatched text for roots, until no more roots can be found. (When in step 2, do not expand candidate matches into previously retained matches.)

Picking good roots in the first step is of importance. The algorithm achieves this by picking text fragments that occur exactly once in each of the texts. It causes each root to produce exactly one candidate mapping. If the algorithm started from a non-unique root, such as e.g. the word "the" in an English text, this would result in (occurrences in first text×occurrences in second text) candidate matches. This would make the algorithm slower, while contributing nothing to match quality because most of them would be short.

There exists a class of documents that are composed from several non-identical but similar repetitions of a base subdocument. This is common in technical documentation, where multiple variations of the same thing are described in single compound document. Examples of this are the documentation of chemicals with various concentrations, medications with various dosages, and mechanical or electrical components which come in various specifications.

Matching text based on text fragments that occur once generally works poorly for this class of documents. Consider the edge case of a compound document that consists of n identical repetitions of a base subdocument: Each text fragment that occurs once in the base subdocument occurs n times in the compound document. If there are no other modifications to the compound document, it therefore contains no text fragments that occur once.

Even if a compound document contains text fragments that occur only once, those can be less helpful than in a document that is not repeating. For one, it will usually contain fewer text fragments that occur only once, providing the comparison with fewer roots from which to start. And those text fragments that do occur once are more likely to be the result of text modifications, making them a poor starting point for any comparison algorithm that attempts first to match all text that is not a modification.

OBJECT OF THE INVENTION

It is the object of the invention to provide a method with an alternate root selection and matching algorithm that works well with compound documents that were created from multiple repetitions of a base subdocument. Since this algorithm requires knowledge of the number of repetitions of the subdocument, we also propose a way to identify this repetition period.

This object is met by the inventions with the characteristics of the independent claims. Advantageous improvements of the inventions are characterised in the subordinate claims.

The comparison method disclosed in the claims furnishes mutually allocated delimited areas which occur in both documents. By means of a suitable user interface, the user can quickly examine the position of these passages in both documents. It is thus possible to quickly visually display to the user both agreements and differences. This is substantially due to the use of lists as will be described below.

A further advantage consists of generating, from the administration of lists, a document that is oriented by the flow of reading, which document can be more easily acquired by the user. Thus the flow of reading of layer documents can be reconstructed by means of a comparison document which is oriented by the flow of reading.

If it was not possible to allocate some passages of a document, this indicates changes in relation to the original. By providing systematic or user-oriented analysis methods, by way of examining the environment in the document flow it is easily possible to detect whether the passages are individual words that have changed or whether they are new text passages or text passages that have been removed.

For comparing documents, at least two documents, Doc1 and Doc2, are present whose content is similar. As has already been described, the flow of reading can be similar to the document flow, or it can be divided into text passages without taking into account the flow of reading.

For technical implementation, the text contents (Content1 and Content2) are extracted from the documents Doc1 and Doc2 according to the document flow.

A basic starting point of the present invention is based on finding unambiguous roots in both documents as disclosed in U.S. Pat. No. 7,392,251 B2. The claimed invention modifies this approach.

SUMMARY OF THE INVENTION

The roots are units which occur in both documents and which in each case are unique. These roots can be individual words, groups of words or other unambiguous textual formatting functions. There is then a search for identical roots in the respective other document (Root1 from Content1, and Root2 from Content2, with Root1=Root2). If a pair has been found, the area around these roots is compared until there is no longer any agreement. During the area search, both the preceding words and the subsequent words are analysed. The areas which are found in this way, Area1 around Root1 and Area2 around Root2, are stored in lists, List1 and List2, which are allocated to Doc1 and Doc2.

Finding pairs and comparing text areas is continued until such time as no new roots are found any longer. A search will only be done in non marked areas.

In particular constellations, the areas can be misallocated. For example, if in one document the root Root1 occurs once only while in the other document the root Root2 also occurs once only, this does not necessarily mean that the same text surrounds these roots Root1 and Root2. Instead, it may happen that Root2 is contained in the text but does not relate to the same area.

Expressed in a more formal way, roots can only have been misallocated if the corresponding part of Root1 is not present in Content2, and in turn a corresponding part of Root2 is not present in Content1. Root1 and Root2 would then happen to be identical.

If roots are misallocated, this can lead to areas within a document overlapping. Overlapping areas necessarily mean that roots have been misallocated.

Generally speaking one can assume that the probability of correct allocation increases as the area detected as being coherent increases.

A detailed instruction prescribes that when colliding areas are present in List1 and List2 respectively, the trustworthy areas, e.g. the smaller areas, are deleted with their partners in the respective other list. The remaining areas are finally connected to each other.

It must be pointed out that new roots can arise in the text passages which have not yet been connected to each other, because the now connected text passages no longer have to be taken into account.

If in the remaining areas there are roots again, the procedure described above is repeated. In this process, already connected text passages are not taken into account. Otherwise, processing of the documents is terminated.

An important aspect consists of the determination of roots, which determination comprises several options.

One option consists of treating the words or word groups of a document as root candidates. In this case a test is made in respect of all candidates to determine whether there are other candidates with an identical content in the same document. If this is the case, the candidate is invalid. The same process is carried out in respect of the comparison document. After this, for each candidate from the document, a search for the partner from the comparison document is made. If such a partner exists, the roots are allocated. The result of this is a list with root pairs.

Other ways of determining roots are also imaginable, such as for example character strings of a certain length, which character strings may also comprise blank characters.

In order to determine the complete segments, in the present invention, starting with the roots, a check is made whether the next elements in sequence (forward and rearward), e.g. sequential words, are identical in both documents. If this is no longer the case, the pair segments end. It may happen that several root pairs generate the same segment pairs, if a search for all the roots has been made in the front end.

Based on root allocation, other approaches are also possible, as described below.

In the single-pass, which is the fastest approach, but which only works well if neither of the documents has any overlapping areas, the found areas are all allocated in a single pass. The document parts that are not contained in the areas are then only contained in one document, and are thus different.

In order to check whether areas overlap, one can use various processes. In a possible embodiment, the words are numbered according to the document flow. By means of the number of the first and last word of an area, this area can be compared with other areas.

In a further embodiment, called multi-pass, first only that area is determined that has been evaluated as being the best area. All other areas are dissolved again and then determined anew, except for the determined area. For these areas the procedure is repeated. If there are no longer any overlapping areas left, the single-pass method can be used for the remainder.

Evaluation of the areas increases the probability of correct allocation when compared to the single-pass method. Allocating areas generates new roots in the remaining text (if a text element exists only once outside the determined area) and thus expands the old allocations or renders them invalid.

There are various user methods for evaluating whether a pair is good or bad, i.e. for the decision whether a pair should or should not be dissolved. One possible embodiment is based on the number of identical words found.

The complete/partial tree method is a method which involves a lot of effort but which as a rule yields the best possible result.

In this method, all possible combinations of regions are generated according to the multi-pass method. However, it is not individual regions that are being evaluated but instead the total result of all regions. The region combination with the best evaluation is marked as being correct.

To this effect it is easiest to take the number of words in the segment by way of evaluation. However, better evaluation methods are imaginable, right up to the use of word entropy.

Based on the evaluation function, this method provides the best-possible matching but it takes an exponentially large amount of time. For this reason, the number of possible regions can be reduced to the n best regions between the individual multi-pass steps.

Based on this general approach the claimed invention provides a more specific approach for documents which have several repetitions of a base subdocument.

The invention provides a computer implemented method for systematically comparing the contents of at least two digitally stored documents (Doc1, Doc2), which are stored on digital medium and which are loaded by a computer to be compared by a computer, wherein the stored documents (Doc1, Doc2) have marked and unmarked areas, wherein at the beginning all the areas are unmarked, wherein the documents have repetitions comprising the following steps:
 a) Computing a histogram of each document, and comparing the histogram with a reference histogram; searching for an n, wherein n is a natural number, which modifies the frequencies of words in one of the histograms in a way that the comparison of the histograms matches within in a predefined range;
 b) searching for identical and roots (Root1, Root2) in the unmarked areas of the documents with n occurrences, of which there are at least two, wherein the roots comprise a string of text symbols, being in particular words, word groups or other unambiguous textual formatting functions, and must only occur exactly n times in each of the documents, and wherein if a root is not unambiguous it is discarded, and wherein a search for the root is carried out in the first document in order to determine unambiguity, and then a search for the root is carried out in the second document in order to determine its unambiguity;
 c) if roots have been found, comparison of the documents, starting with the roots (Root1, Root2), until there is no longer any agreement, wherein the areas (Area1, Area2) found in this way are being marked;
 d) repeating the above steps, starting with b) in a recursion until there are no longer any unique and identical roots or until no longer any found areas can be marked, wherein the marked areas are at first not taken into account in the search for roots and areas;

In a first step a Word Frequency Analysis is performed.

The analysis of text corpora shows that most languages are subject to a statistical relation known as Zipf's law: The frequency of a word's occurrence in a text is roughly proportional to the inverse of its frequency rank $$\left(f(r) \sim \frac{1}{r}\right).$$

(For example, the most frequent word occurs about twice as often as the second-most frequent word, and thrice as often as the third-most frequent word, etc.)

This distribution has a so-called "long tail," meaning that most words occur very rarely. Usually between 40 and 50 percent of words that occur in a text occur just once, around 20 percent occur twice, around 10 percent occur thrice, and so on.

The shape of this tail changes if a text is assembled from n repetitions of a base subdocument: 40 to 50 percent of words are now words that occur n times, around 20 percent occur 2n times, 10 percent $3n$ times, and so on. This can be used to detect to determine n for a document where n is not known:
 1. Tokenize the document into words
 2. Count the occurrences of each distinct word
 3. Starting with n=1, compare the histogram of word frequencies n, 2n, 3n, . . . from the document with the reference histogram of word frequencies 1, 2, 3, . . . from a large text corpus
 4. If step 3 produced a match below a reasonable error threshold, terminate and return n
 5. Increment n and go back to step 3

In other words: The repetition period is the lowest n that matches the expected word frequency histogram.

In the next step the Document Pairs with Known-Identical Subdocument Repetition Period are compared.

When comparing two compound documents, knowing that both have the repetition period n can be used to optimize our comparison algorithm. In the simpler case, both compound documents are known to repeat in the same order. In this case the comparison algorithm does this:
 1. Search both texts for roots, which are short text fragments that occur exactly n times in each of the texts.
 2. For m=1 . . . n, match each root's mth occurrence in one document with the mth occurrence in the other document. Expand these candidate matches as in the unmodified algorithm.
 3. Continue the algorithm as before. (Optionally, instead of assessing each candidate match individually, measure the combined length of all matches generated from a root n-tuplet. Then keep all candidate matches for the best root.)

This becomes somewhat more difficult if it cannot be assumed that the two compound documents repeat the base subdocument in the same order. In this case:
 1. Search both texts for roots as above.
 2. Try out all permutations of matching a root's n occurrences in one text to the n occurrences in the other text. Expand the matches, and keep the permutation that produces the longest match.
 3. Continue as above.

If most roots in a large enough sample result in the same permutation, then it becomes unnecessary to try all permutations for every root n-tuple. It can be assumed that the dominating permutation is the permutation of the order of subdocuments in the two compound documents.

BRIEF DESCRIPTION OF THE DRAWINGS

Below, the invention is explained in detail with reference to an embodiment that is shown diagrammatically in the figures. Identical reference numbers in the individual figures designate identical elements.

FIG. 3 discloses a sample document.

DETAILED DESCRIPTION

Figure 1:
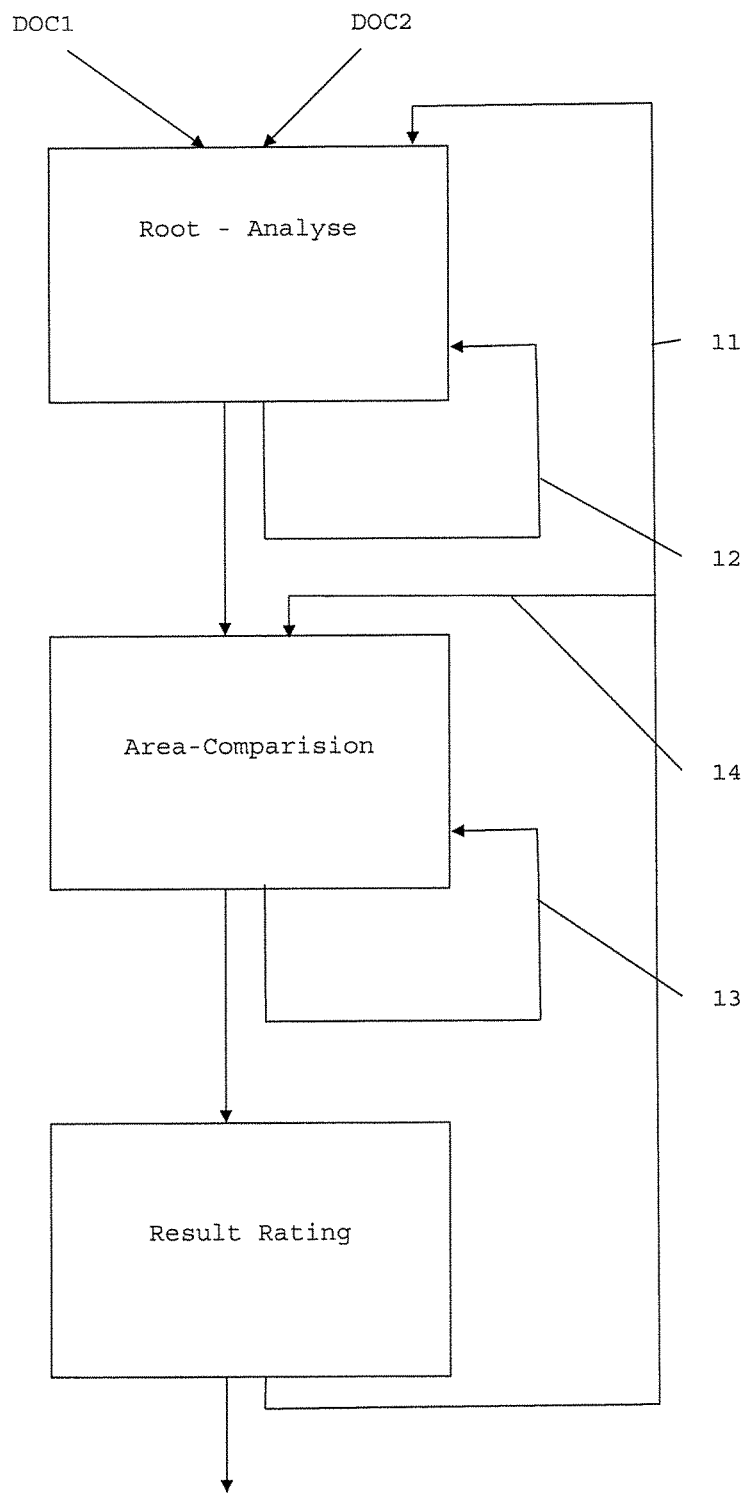
FIG. 1 is a flow chart of the method according to U.S. Pat. No. 7,392,251 B2.

According to FIG. 1, two documents, DOC1 and DOC2 are used for carrying out the root analysis. The root analysis can either be carried out once only, before an area analysis is carried out, or the root analysis can be carried out multiple times as is shown from connection 12.

If the analysis is carried out multiple times, then list structures are prepared which accommodate the root pairs. The area analysis can also be run multiple times, as is shown by the connection 13, provided a list structure with roots exists. After evaluation of the result, the process parts can either be carried out completely anew, in that areas are dissolved, or a search is made for new roots in order to then carry out the process anew. Depending on whether the multi-pass method or the complete/partial tree method, described in the claims, is used, evaluation of the result is different and leads to either a complete new start of the method, or a partial new start of the method.

Based on this root analysis the finding for roots is modified.

As a sample document the following text is used.

"The name of this medicine is DeviEx 5 mg tablets. Each tablet contains 5 mg devocilanix as active ingredient. The tablets contain also the following inactive ingredients: Lactose, magnesium stearate, baking soda, calcium caprylate, citric acid, dicalcium phosphate, methyl paraben DeviEx 5 mg tablets are available in cartons containing 20 tablets. DeviEx 5 mg tablets belong to a group of medicine called antineoplastic or cytotoxic drugs which are used to reduce pain in the joints, gums and the back."

The preceding document contains 79 words. It is composed from 59 unique words:

TABLE 1

| Word frequency | | | Unique words |
|---|---|---|---|
| 5 | 1 | 2% | "tablets" |
| 4 | 2 | 3% | "5", "mg" |
| 3 | 2 | 3% | "DeviEx", "the" |
| 2 | 6 | 10% | "are", "in", "medicine", "of", "The", "to" |
| 1 | 48 | 81% | ... |

Table 1 shows in the first column the frequency of the words. In the second column the number of words with their corresponding frequency is listed. In the third column the percentage of the single unique word in relation to the total number of unique words is listed. In the last column the words itself are listed. So in the first line the term "tablets" has a frequency of 5, there is only one word with a frequency of 5, which is 2% of the total unique words.

Here 48/59=81% of words occur just once. This is a bit more than we would expect according to Zipf's law, but that is because the document is very short, causing even frequent words such as "a" and "and" to occur only once. But in general we see what we would expect according to Zipf's law: few words occur frequently, while most words occur rarely.

When comparing this document to a similar document, the claimed algorithm starts with so-called roots, which are words that have a frequency of one in both documents. Starting with a word such as "cytotoxic" has a better likelihood of correctly aligning the text strings than e.g. attempting to match a "the" in one document to a "the" in the other.

Repeating this document three times to create a compound document would obviously not add or remove unique words, but triple the word frequencies:

TABLE 2

| Word frequency | | Unique words |
|---|---|---|
| 15 | 1 | "tablets" |
| 12 | 2 | "5", "mg" |
| 9 | 2 | "DeviEx", "the" |
| 6 | 6 | "are", "in", "medicine", "of", "The", "to" |
| 3 | 48 | ... |

Table 2 shows the table 1 but with a multiplication of 3 in the first column for the 3 repetitions.

Assume that the repetitions of the base document are for different dosages. Therefore the word "5" changes to "10" in the first repetition, and to "20" in the second repetition. This would result in the following word frequencies:

TABLE 3

| Word frequency | | | Unique words |
|---|---|---|---|
| 15 | 1 | 2% | "tablets" |
| 12 | 1 | 2% ↓ | "mg" |
| 9 | 2 | 3% | "DeviEx", "the" |
| 7 | 1 | 2% ↑ | "20" |
| 6 | 6 | 10% | "are", "in", "medicine", "of", "The", "to" |
| 4 | 2 | 3% ↑ | "5", "10" |
| 3 | 47 | 78% ↓ | ... |

The Table 3 shows that "5" and "10" now has a frequency of 4 instead of 12 in Table 2 for "5". The "10" is newly introduced and has also a frequency of 4.

The unmodified text comparison algorithm from U.S. Pat. No. 7,392,251 B2 obviously cannot pick a word that occurs only once as a root here, because the least frequent words occur at least three times.

In our revised algorithm, we attempt to identify the repetition period n of this compound document. This is done by comparing the word frequencies $f_1, f_2, f_3 \ldots$ of a large text corpus with the word frequencies $n \times f_1, n \times f_2, n \times f_3 \ldots$ of the compound document.

TABLE 4

| Reference | | Period = 1 | | | Period = 2 | | | Period = 3 | | | Period = 4 | | |
|---|---|---|---|---|---|---|---|---|---|---|---|---|---|
| f | w | n × f | w | err | n × f | w | err | n × f | w | err | n × f | w | err |
| 1 | 0.50 | 1 | 0.00 | 0.50 | 2 | 0.00 | 0.50 | 3 | 0.78 | 0.28 | 4 | 0.03 | 0.47 |
| 2 | 0.20 | 2 | 0.00 | 0.20 | 4 | 0.03 | 0.17 | 6 | 0.10 | 0.10 | 8 | 0.00 | 0.20 |
| 3 | 0.10 | 3 | 0.78 | 0.68 | 6 | 0.10 | 0.00 | 9 | 0.03 | 0.07 | 12 | 0.02 | 0.08 |
| 4 | 0.05 | 4 | 0.03 | 0.02 | 8 | 0.00 | 0.05 | 12 | 0.02 | 0.03 | 16 | 0.00 | 0.05 |
| Σ err | | | | 1.40 | | | 0.72 | | | 0.48 | | | 0.80 |

Table 4 shows, in the first column the frequency. In the second the distribution in % which can be calculated based on Zipf's law or statistical values can be used which have been collected. Consequently the first two columns define the reference. A group of 3 following columns represent values for each Period n=1, 2, 3, 4.

In the third column the Period n=1 is multiplied with f of the first column. In this case the third column and the first column are identical since the Period is n=1. The fourth column represents the distribution w which is calculated on the basis of table 3. In table 3 there is no word which occurs once. So w in the first line is 0.00. The error is indicated in the fifth column which is the absolute difference of the reference w=0.50 of the second column and w of the fourth column.

As another example the reference f=3 is selected for which the reference value 0.10 in the second column is given. n×f is 3, w is 0.78=78% which can be derived from the last line of table 3, so the error value is err=abs(0.10−0.78)=0.68. In the last line the sum of the error values is listed, which is for period n=1 1.40.

In the next step Period=3 will be discussed which is the most relevant, since here the sum of the error values is 0.48. For f×n=1×3=3 in the first line w=0.78, see table 3, the error err=abs(w−f reference)=abs(w−0.5)=abs(0.78−0.50)=0.28. For the last line n×f=12 the 2% auf line 2 of table 3 is selected generating an err=0.05.

Figure 2:
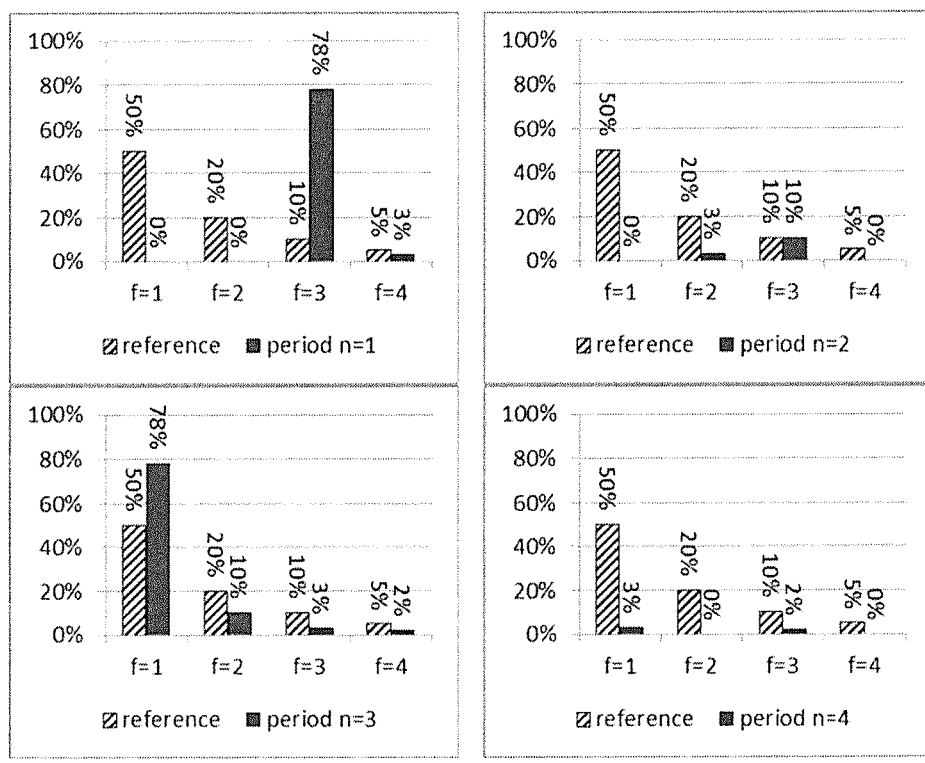
FIG. 2 shows Frequency histograms for n=1, n=2, n=3, n=4 periods.

As it can be derived from FIG. 2 the frequency histogram for a period of 3 is the closest match to the histogram of the reference text corpus. On the x-axis the f=1, f=2, f=3, f=4 are listed and for each f the left bar indicates the reference w and the right bar the total err. As it can be derived from period n=3 the bars are close to each other. I.e. the fraction of words that occur 1, 2, 3 . . . times in the reference corpus is closest matched by the fraction of words that occur 3, 6, 9 . . . times in the compound document. The document is therefore correctly determined to be a compound document consisting of three repetitions of a base document.

The claimed comparison algorithm now chooses roots by finding those words that occur n=3 times on both sides of the compared document pair, and matching the first occurrence on one side with the first occurrence on the other side, the second occurrence on one side with the second occurrence on the other side, and so on.

As it can be derived from the description above the various words in a text are found differently often. Different words have therefore a different frequency.

When considering the word frequencies all words with the same frequency are grouped. (All words that occur once, occur are in first group. All words that occur twice, are in a second group. Etc.)

In a sense, the frequency of the frequency is considered. This defines the histogram. Linguists have found that such distributions are quite similar in virtually all languages: there are many words that are rare, but a few words that are common. So, if one takes a text (which is not very short), creates the histogram, and compares it to another histogram, also created from natural language text, certain accordance, though not exact, could be found.

When a text is largely repeated, its histogram changes correspondingly. The histogram of a largely repeated text does not match with the reference histogram. By simulating a transformation of a non-repetitive histogram, the number of repetitions can be determined, when it fits with respect to certain error.

For example, assume that the sample compound document is compared with a version of the compound document in which the name of the medicine has been changed from "DeviEx" to "DeviAx." (see FIG. 3) There are no words that occur exactly once on either side, so that there are no roots from which the known comparison algorithm could start. But the modified algorithm created a root for example by pairing the word "Lactose" in the text segment labeled (1) below, and two more roots by pairing "Lactose" in segments (2) and (3).

Like with the patented algorithm, in claimed invention maps text by repeatedly starting at the root from which the longest common text sequence can be matched. After three iterations, the text segments labeled (1), (2), and (3) have been mapped from roots such as "Lactose." The segments (4), (5), and (6) are mapped after three more iterations. They do not contain globally unique roots either, but the root selection based on repetition period creates roots for example by pairing the word "cytotoxic" in segment (4), and then again in segments (5) and (6).

In one embodiment, a data medium for a computer is provided, characterized by storing a data structure with software according to the method and algorithm described above. In another embodiment, a computer system is provided, characterized by a device which makes it possible to start and run a method according to the method and algorithm described above.

What is claimed is:

1. A computer implemented method for systematically comparing contents of at least two digitally stored documents (Doc1, Doc2), which are stored on digital medium and which are loaded by a computer to be compared by a computer, wherein initially all areas of the stored documents (Doc1, Doc2) are unmarked, wherein the stored documents have repetitions, comprising the following steps:

a) computing a histogram of at least one of the stored documents, and comparing the computed histogram with a reference histogram associated with a reference document, each histogram including word frequencies (f1, f2, f3 . . . ) and a group associated with each word frequency, each group corresponding to a fraction of words in each document occurring with the same word frequency, the comparing including searching for and identifying a repetition number n, wherein n is a natural number, which when multiplied by the word frequencies in the computed histogram, causes a comparison of groups in the reference histogram associated to a given word frequency (f1, f2, f3 . . . ) to match groups in the computed histogram associated to the given word frequency multiplied by n (n×f1, n×f2, n×f3 . . . ) within a predefined range;

b) searching for identical and roots (Root1, Root2) in the unmarked areas of the documents with n occurrences, of which there are at least two, wherein the roots comprise a string of text symbols, being in particular words, word groups or other unambiguous textual formatting functions, and must only occur exactly n times in each of the documents, and wherein if a root is not unambiguous it is discarded, and wherein a search for the root is carried out in the first document in order to determine unambiguity, and then a search for the root is carried out in the second document in order to determine its unambiguity;

c) if roots have been found, comparison of the documents, starting with the roots (Root1, Root2), until there is no longer any agreement, wherein the areas (Area1, Area2) found in this way are being marked;

d) repeating the above steps, starting with b) in a recursion until there are no longer any unique and identical roots or until no longer any found areas can be marked, wherein the marked areas are at first not taken into account in the search for roots and areas; and e). providing a user interface that enables a user to examine positions of the marked areas (Area1, Area2) in each of the documents.

2. The computer implemented method according to claim 1, wherein the step a) comprises the following sub steps for each document:
1. Tokenize the document into words
   a) Count the occurrences of each distinct word
   b) Starting with n=1, compare the histogram of word frequencies n, 2n, 3n, . . . from the document with the reference histogram of word frequencies 1, 2, 3, . . .
   c) If step 3 produced a match below a reasonable error threshold, terminate and return n
   d) Increment n and go back to step 3.

3. The computer implemented method according to claim 1, wherein the reference histogram is calculated based on a large reference document or based on Zipf's law.

4. The computer implemented method according to claim 1, wherein the histogram is a grouping of all words with an equal frequency.

5. The computer implemented method according to claim 1, wherein if the repetitions do not occur in the same order, trying out all permutations of matching a root's n occurrences in one document to the n occurrences in the other documents, expanding the matches, and keeping the permutation that produces the longest match.

6. The computer implemented method according to claim 1, wherein the areas Area1 around Root1 and Area2 around Root2, are stored in lists List1 and List2, which are allocated to Doc1 and Doc2.

7. The computer implemented method according to claim 1, wherein in the case of misallocated roots, which is indicated by areas within a document that overlap, and at least one of the areas is released and unmarked for a renewed root search.

8. The computer implemented method according to claim 7, wherein from colliding areas in List1 or List2 more lowly evaluated partners in the respective other list are deleted.

9. The computer implemented method to claim 1, wherein a multi-pass method is used, in which after a first pass only one or several areas which are evaluated as being best are determined, wherein all other areas are released and unmarked again and subsequently, at the exclusion of the determined area, are determined by new passes.

10. The computer implemented method to claim 9, wherein the single-pass method is used for the remaining areas if there are no longer any overlapping areas.

11. The computer implemented method according to claim 1, wherein a complete/partial tree method is used in which all possible combinations of areas are generated according to a multi-pass method, wherein the best combination is selected.

12. The computer implemented method according to claim 11, wherein the overall result of all regions is evaluated.

13. The computer implemented method according to claim 11, wherein a number of possible regions is reduced to the n best regions between the individual multi-pass steps.

14. The computer implemented method according to claim 1, wherein the roots are formed from one or several of the following characters: words, group of words, control characters.

15. The computer implemented method according to claim 1, wherein starting from the roots an area is examined in both directions for finding identical areas.

16. A non-transitory data medium for a computer, characterised by storing an algorithm to perform a method according to claim 1.

17. A computer that makes it possible to start and run a method according to claim 1.

* * * * *